(12) United States Patent
Brendel

(10) Patent No.: US 9,950,333 B2
(45) Date of Patent: Apr. 24, 2018

(54) DEVICE FOR COATING PARTS INCLUDING A MOVABLE RECEIVER IN WHICH A DISPENSER DEVICE AND AN IR EMITTER DEVICE ARE LOCATED

(75) Inventor: Gerhard Brendel, Auerbach (DE)

(73) Assignee: Special Coatings GmbH & Co. KG (DE)

( * ) Notice: Subject to any disclaimer, the term of this patent is extended or adjusted under 35 U.S.C. 154(b) by 1404 days.

(21) Appl. No.: 11/817,635

(22) PCT Filed: Mar. 1, 2006

(86) PCT No.: PCT/EP2006/060378
§ 371 (c)(1),
(2), (4) Date: May 13, 2008

(87) PCT Pub. No.: WO2006/092423
PCT Pub. Date: Sep. 8, 2006

(65) Prior Publication Data
US 2009/0017224 A1    Jan. 15, 2009

(30) Foreign Application Priority Data

Mar. 4, 2005 (DE) .................. 10 2005 010 005

(51) Int. Cl.
*B05B 13/02* (2006.01)
*B05C 11/10* (2006.01)
(Continued)

(52) U.S. Cl.
CPC ............ *B05B 13/0257* (2013.01); *B05C 3/05* (2013.01); *B05C 11/1015* (2013.01);
(Continued)

(58) Field of Classification Search
CPC ... B05D 2258/00; B05C 19/02; B05C 5/0208; B05C 5/001; B05C 9/14; B05C 3/05;
(Continued)

(56) References Cited

U.S. PATENT DOCUMENTS 3,451,375 A * 6/1969 Frithjof ........................... 118/19
3,480,468 A 11/1969 Carletti et al.
(Continued)

FOREIGN PATENT DOCUMENTS

CH    428094    7/1967
CH    673962 *  3/1990 ................ B01J 2/30
(Continued)

OTHER PUBLICATIONS

Cerea et al "A novel powder coating process for attaining taste masking and moisture protective films applied to tablets", International Journal of Pharmaceutics, vol. 279, Issues 1-2, Jul. 26, 2004, pp. 127-139.*

*Primary Examiner* — Karl Kurple
(74) *Attorney, Agent, or Firm* — Price Heneveld LLP

(57) ABSTRACT

The present invention relates to a coating device for small parts, in particular for lacquering mass produced small parts, like e.g. bolts, small plastic parts and similar, and it relates to a method for this purpose with a movable receiver element for receiving and moving the small parts, and a dispenser device, located at the receiver element for continuous or portioned dispensing the coating material into the receiver element, wherein a radiation emitter device is provided in the receiver element for emitting radiation for drying and/or hardening the coating material.

10 Claims, 3 Drawing Sheets

Figure 1:
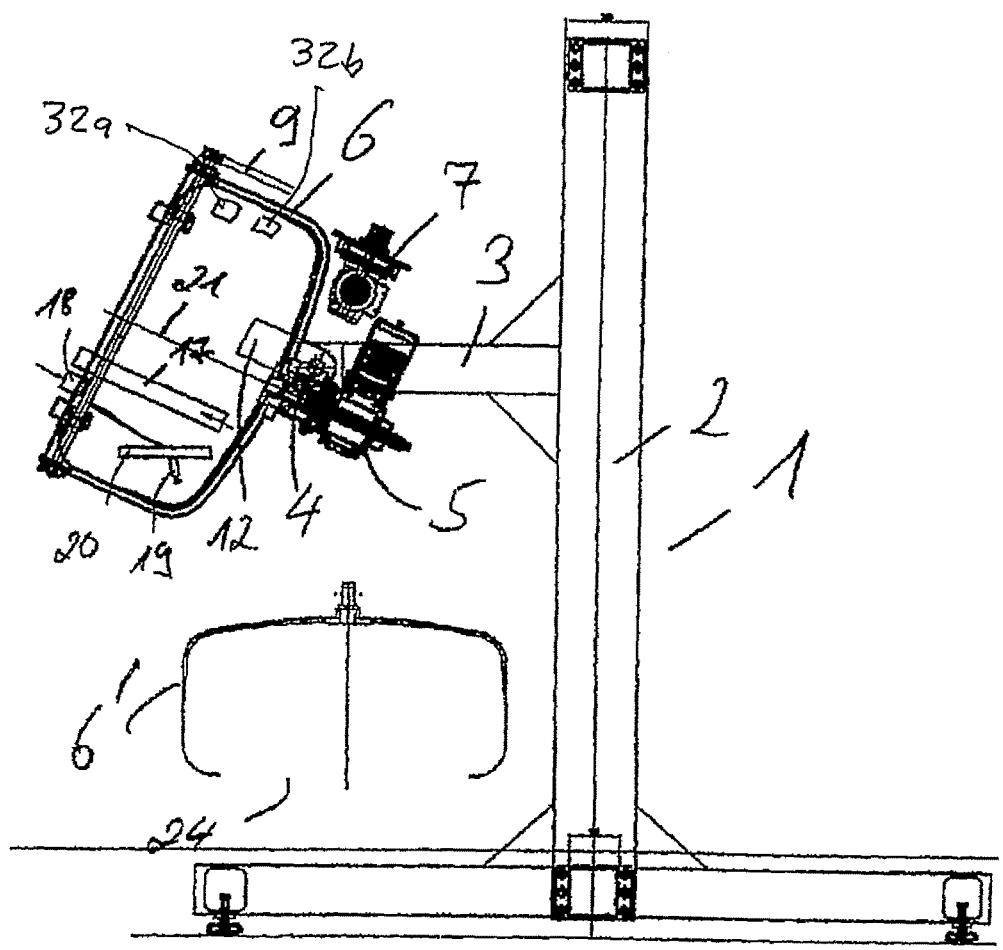

(51) Int. Cl.
  *B05C 3/05* (2006.01)
  *A61J 3/06* (2006.01)
  *B01J 2/12* (2006.01)
  *A23G 3/26* (2006.01)

(52) U.S. Cl.
  CPC ............ B05C 11/1034 (2013.01); *A23G 3/26* (2013.01); *A61J 3/06* (2013.01); *B01J 2/12* (2013.01); *B05D 2258/00* (2013.01)

(58) Field of Classification Search
  CPC ... B05C 3/08; B05C 11/1015; B05C 11/1034; B01J 8/24; A23P 1/083; B05B 13/0257
  USPC ....... 118/19, 320, 416, 417, 418, 20, 29, 64, 118/620, 629, 641–643, 303; 427/425, 427/426, 481, 471, 542, 350, 421.1
  See application file for complete search history.

(56) References Cited

U.S. PATENT DOCUMENTS

| | | | | |
|---|---|---|---|---|
| 3,896,762 | A * | 9/1975 | Banker | 118/30 |
| 4,048,473 | A * | 9/1977 | Burkhart | 219/389 |
| 4,132,753 | A * | 1/1979 | Blichare | A61K 9/1617 264/117 |
| 4,133,290 | A * | 1/1979 | Melliger | 118/668 |
| 4,485,124 | A * | 11/1984 | Ciparisso | 427/542 |
| 4,496,828 | A * | 1/1985 | Kusmierz et al. | 219/405 |
| 4,505,953 | A * | 3/1985 | Chen et al. | 427/212 |
| 4,533,820 | A * | 8/1985 | Shimizu | 219/411 |
| 4,554,887 | A * | 11/1985 | Yoakam et al. | 118/666 |
| 4,640,218 | A * | 2/1987 | Motoyama et al. | 118/19 |
| 4,958,061 | A * | 9/1990 | Wakabayashi et al. | 219/411 |
| 5,050,528 | A * | 9/1991 | Yamada | A23G 3/26 118/19 |
| 5,073,698 | A * | 12/1991 | Stultz | 219/405 |
| 5,160,545 | A * | 11/1992 | Maloney et al. | 118/725 |
| 5,188,058 | A * | 2/1993 | Nakai | 118/719 |
| 5,288,364 | A * | 2/1994 | Burt et al. | 117/86 |
| 5,326,171 | A * | 7/1994 | Thompson et al. | 374/121 |
| 5,362,505 | A | 11/1994 | Hsieh et al. | |
| 5,372,648 | A * | 12/1994 | Yamamoto et al. | 118/723 E |
| 5,393,346 | A * | 2/1995 | Cholewa | 118/320 |
| 5,411,588 | A * | 5/1995 | Diepens et al. | 118/666 |
| 5,418,593 | A * | 5/1995 | Fyson | 396/635 |
| 5,429,825 | A * | 7/1995 | Reo et al. | 424/490 |
| 5,444,814 | A * | 8/1995 | Hofius, Sr. | 392/407 |
| 5,482,557 | A * | 1/1996 | Kanai et al. | 118/719 |
| 5,494,709 | A * | 2/1996 | Long et al. | 427/4 |
| 5,495,418 | A * | 2/1996 | Latini et al. | 700/123 |
| 5,507,868 | A * | 4/1996 | Takei | A23G 3/26 118/19 |
| 5,560,122 | A * | 10/1996 | Bauer et al. | 34/268 |
| 5,587,019 | A * | 12/1996 | Fujie | 118/725 |
| 5,601,873 | A * | 2/1997 | Nakazawa et al. | 427/212 |
| 5,895,542 | A * | 4/1999 | Wadzinski | 156/242 |
| 6,021,152 | A * | 2/2000 | Olsen et al. | 372/99 |
| 6,142,095 | A * | 11/2000 | Long | 118/13 |
| 6,223,452 | B1 * | 5/2001 | Hamand | 34/267 |
| 6,511,541 | B2 * | 1/2003 | Pentecost | 118/303 |
| 6,547,882 | B1 | 4/2003 | Bohle | |
| 6,557,486 | B2 * | 5/2003 | Giogoli | B01J 2/006 118/19 |
| 6,559,064 | B1 * | 5/2003 | Shimizu | 438/745 |
| 6,569,462 | B1 * | 5/2003 | Cornelli et al. | 424/497 |
| 6,614,005 | B1 * | 9/2003 | Walk et al. | 219/390 |
| 6,620,246 | B2 * | 9/2003 | Alaimo et al. | 118/681 |
| 7,614,359 | B2 * | 11/2009 | Hasegawa et al. | 118/13 |
| 7,810,446 | B2 * | 10/2010 | Degady et al. | 118/13 |
| 7,836,842 | B2 * | 11/2010 | Hasegawa et al. | 118/24 |
| 7,862,848 | B2 * | 1/2011 | Zhu et al. | 427/2.1 |
| 7,875,833 | B2 * | 1/2011 | Song | 219/389 |
| 8,138,451 | B2 * | 3/2012 | Gat et al. | 219/390 |
| 8,161,904 | B2 * | 4/2012 | Zhu et al. | 118/627 |
| 2002/0081388 | A1 * | 6/2002 | Batliner et al. | 427/421 |
| 2002/0117108 | A1 * | 8/2002 | Pentecost | 118/303 |
| 2002/0134303 | A1 * | 9/2002 | Giogoli | 118/19 |
| 2003/0145786 | A1 * | 8/2003 | Nohynek | 118/303 |
| 2003/0178734 | A1 * | 9/2003 | Josephy et al. | 264/81 |
| 2004/0065262 | A1 * | 4/2004 | Burns et al. | 118/730 |
| 2004/0250757 | A1 * | 12/2004 | Natsuyama et al. | 118/300 |
| 2005/0160980 | A1 * | 7/2005 | Khoury et al. | 118/668 |
| 2005/0217572 | A1 * | 10/2005 | Young et al. | 118/313 |
| 2006/0096527 | A1 * | 5/2006 | Hasegawa | B05B 13/0257 118/19 |
| 2006/0228487 | A1 * | 10/2006 | Schaible et al. | 427/421.1 |
| 2007/0202268 | A1 * | 8/2007 | Natsuyama et al. | 427/425 |
| 2008/0050518 | A1 * | 2/2008 | Juergens | 427/242 |
| 2008/0193632 | A1 * | 8/2008 | O'Hara et al. | 427/2.18 |
| 2009/0064926 | A1 * | 3/2009 | Nowak et al. | 118/258 |
| 2009/0126628 | A1 * | 5/2009 | Brendel | 118/708 |
| 2009/0220676 | A1 * | 9/2009 | Koerblein | 427/2.14 |
| 2010/0077956 | A1 * | 4/2010 | Zuehlke et al. | 118/19 |
| 2010/0186470 | A1 * | 7/2010 | Xing et al. | 71/27 |
| 2010/0206223 | A1 * | 8/2010 | Pilipauskas et al. | 118/319 |
| 2011/0081415 | A1 * | 4/2011 | Kishimoto et al. | 424/465 |
| 2011/0088620 | A1 * | 4/2011 | Maurer | 118/712 |
| 2011/0197810 | A1 * | 8/2011 | Fusejima et al. | 118/16 |
| 2011/0256305 | A1 * | 10/2011 | Jacques et al. | 427/2.18 |
| 2011/0287166 | A1 * | 11/2011 | Dunajtschik et al. | 426/665 |
| 2012/0015085 | A1 * | 1/2012 | Liberatore | 426/304 |
| 2012/0015101 | A1 * | 1/2012 | O'Hara et al. | 427/212 |
| 2012/0234239 | A1 * | 9/2012 | Hasegawa et al. | 118/712 |
| 2012/0263864 | A1 * | 10/2012 | Waldron | 427/2.18 |
| 2013/0011548 | A1 * | 1/2013 | Umemoto et al. | 427/8 |
| 2014/0374469 | A1 * | 12/2014 | Jossick | B23K 1/203 228/207 |

FOREIGN PATENT DOCUMENTS

| | | | | |
|---|---|---|---|---|
| CH | 673 962 | * | 4/1990 | |
| CH | 673962 | | 4/1990 | |
| CH | 673962 | A5 * | 4/1990 | A61J 3/005 |
| DE | 1274475 | | 8/1968 | |
| DE | 2249863 | | 4/1974 | |
| DE | 2715494 | | 3/1976 | |
| DE | 2445102 | | 4/1976 | |
| DE | 2715891 | | 1/1978 | |
| DE | 133019 | | 11/1978 | |
| DE | 3446424 | * | 6/1986 | F26B 3/30 |
| DE | 8524347 | | 1/1987 | |
| EP | 0744212 | | 11/1996 | |

* cited by examiner

DEVICE FOR COATING PARTS INCLUDING A MOVABLE RECEIVER IN WHICH A DISPENSER DEVICE AND AN IR EMITTER DEVICE ARE LOCATED

TECHNICAL FIELD

The present invention relates to a method and a device for coating small parts, in particular mass produced small parts, like bolts, small plastic parts, or similar.

STATE OF THE ART

From the Patent document DE 85 24 347 U1, a device for coating small parts, in particular pharmaceuticals, is known, including a rotating drum and a spray gun disposed in the interior of the drum for distributing the coating material. Such a device is also used for lacquering small parts, wherein the lacquer is dried through warm air, which is run through the drum. Through turning the small parts over during the coating process, it is assured that the coating material or the lacquer is distributed evenly onto all small parts. In order to avoid damaging the coating, which has not dried or hardened yet, through the motion of the small parts and the associated collisions, the small parts have to be at a certain minimum temperature, allowing a quick drying of the lacquer, or of the coating material. For this reason, it is necessary to heat the small parts before the beginning of the coating process through turning them over and passing hot air through. This, however, requires a large amount of time, so that coating with such a device is not efficient.

SUMMARY OF THE INVENTION

Therefore, it is an object of the present invention to overcome the disadvantages of the known devices, and in particular, to provide a device and a process, allowing a fast and economical coating of small parts, in particular mass produced small parts with a high surface quality. In particular, also all possible geometries of small parts, part of which cannot be coated with the known device, are to be coated in an efficient manner.

An aspect of the invention is characterized in that the drying and/or the hardening is performed through radiation energy in a device or a process, in which the small parts to be coated are provided with coating material during a motion, like, e.g., a constant turning over or shaking. In particular, infrared (IR) emitters and/or ultraviolet (UV) emitters can be used as energy emitters, since with these a fast and even heating of the parts to be coated and/or a hardening of the coating material, like, e.g., UV hardening lacquer, is facilitated. Furthermore, such energy emitters are easy to operate and/or control, or regulate, which simplifies the coating process further, allowing an efficiency increase. In particular, a significant shortening of the warm up or start up time can be observed, which is necessary e.g., in order to bring the small parts to be coated to a minimum temperature required for the coating. Furthermore, overall, through the fast and even hardening of the deposited coating material, a significantly improved layer quality and surface quality is accomplished in comparison to the state of the art. As a further advantage, bodies with any geometry can be coated, which cannot be coated satisfactorily with the state of the art technology.

As IR emitters, short-, medium-, and long wave IR emitters are suitable, and emitters with a wavelength spectrum close to the IR range. Also, so-called carbon IR emitters with a special medium wave wavelength spectrum have proven to be very efficient. One or more emitter units can be provided, and also one or more emitters per emitter unit can be provided.

The movement of the small parts can be performed through receiving them in a rotating drum, which has transport ribs, in particular facilitating the turning over of the small parts in the drum through the rotating motion. Besides the rotating motion of a drum, also further types of devices for motion generation are suitable, allowing a continuous or constantly repeating motion of the small parts. In particular, shaking and rattling apparatuses are suitable.

The dispensing of a coating material, in particular of a solvent based or water based lacquer, or of a powder, is performed through a dispensing device, allowing the creation of thin, fine films on the small parts to be coated, so that an immediate drying and/or hardening is accomplished through the imparted radiation energy.

The dispensing device can be a spraying or squirting device, allowing a fine atomization of the coating material, so that it is deposited on the small parts in very fine droplets or powder layers. The spraying or squirting device can be formed by any suitable known device, wherein the atomization of the coating material can be performed together with an auxiliary material or gas, like air, or water vapor. In particular, the water vapor supported deposition through spraying has proved to be advantageous. Accordingly, the respective device comprises respective means for supplying and storing the coating material and/or the auxiliary material.

The coating device, besides allowing the continuous dispensing of small amounts of coating material, also allows the dispensing of extremely small amounts of coating material in intermittent small portions, so that thereby also an instant drying and/or hardening can be made possible.

A respective control or regulation device also be provided here, which can be based on a programmable processor. This control and/or regulation device can also take over the control and/or regulation of the radiation power and/or the duration of the emitter unit(s). Certainly, however, also a separate control and/or regulation for the emitter(s) are possible.

For controlling the emitter unit and/or the dispensing device, sensors (such as gas sensor 32a and steam sensor 32b) can be provided, determining the control parameters as, e.g., the temperature of the small components, or the water vapor, or the solvent vapor content, or the powder volume in the coating device.

Ventilation openings are can be provided in the receiver element, in which the small parts are received for coating, allowing the venting, in particular for removing the solvents or the water vapor or the powder dust, wherein in particular an evacuation device is connected through a fan with the air exhaust vent. It is thereby advantageous, when the ventilation openings are provided, so that a complete ventilation of the receiving element, or the drum, is allowed. For this purpose, spouts can be provided at the openings, which can at least partially protrude into the receiving space.

According to one of several embodiments, the ventilation openings are disposed with their spouts at one or several closure elements or covers, closing the receiving cavity of the receiving element, e.g., of a drum, so that they can be removed from the receiving cavity, when the receiving element is opened. Accordingly, also the IR emitter devices and/or the dispensing devices, e.g. the spray gun, can be disposed at one or several closing elements so that the at least one IR radiation emitter device and/or the at least one dispenser device is configured to be moved into and out of a receiving area of the movable receiver element through operating the at least one closing element. This allows a simple emptying and cleaning of the receiving element. The pivot motion range of the receiving element according to another preferred embodiment also serves this purpose.

SHORT DESCRIPTION OF THE DRAWINGS

Figure 2:
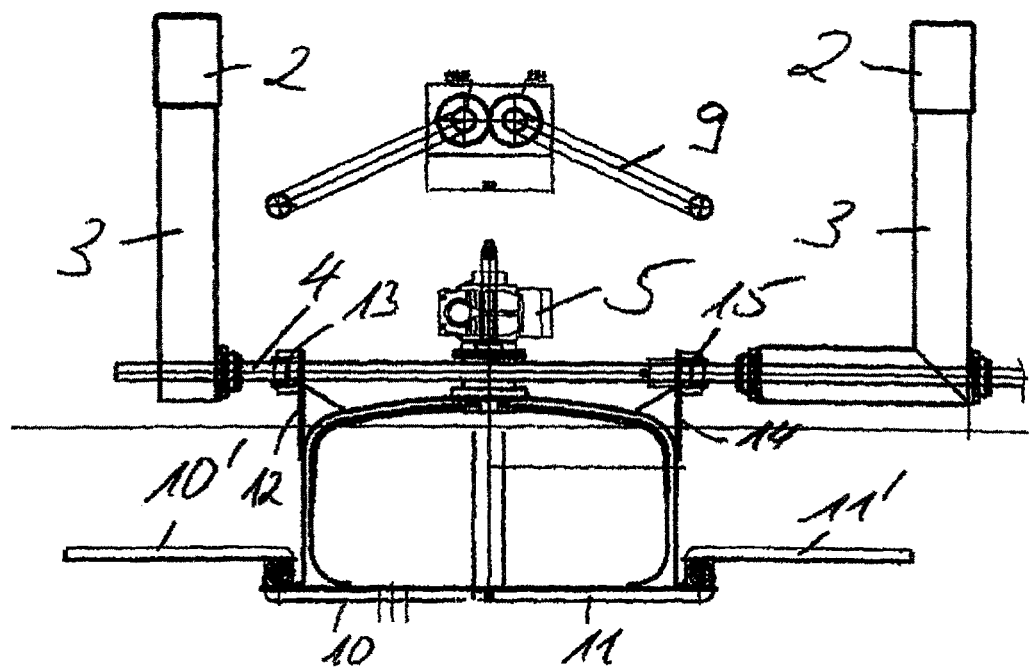
Figure 3:
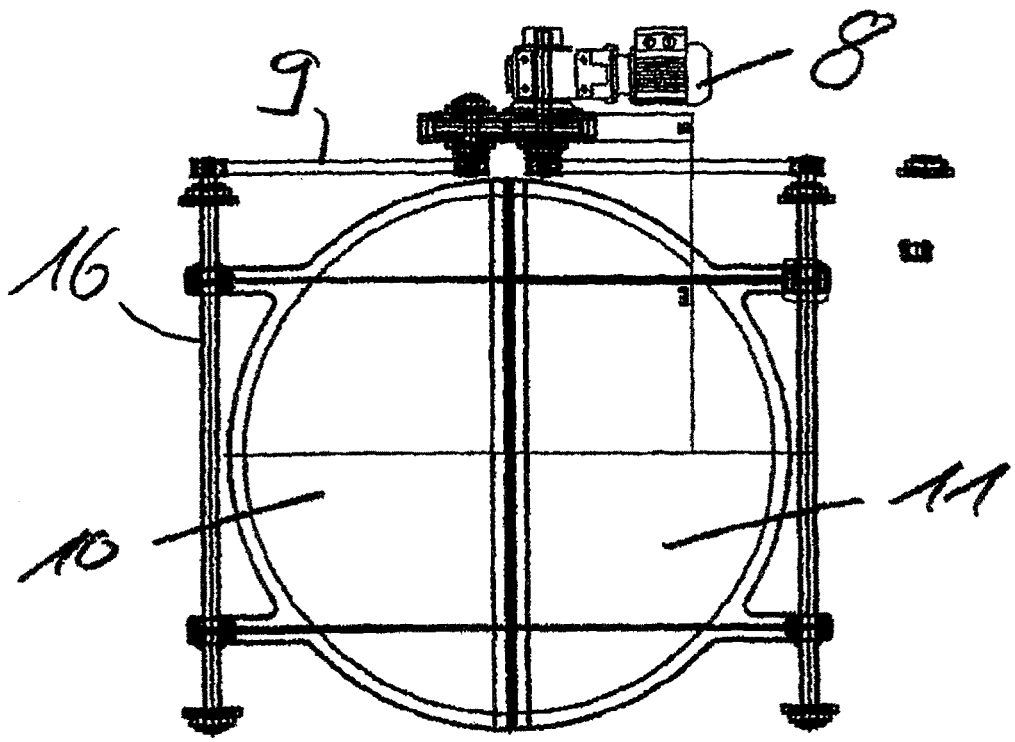

Further advantages, characteristics, and features of the present invention become apparent from the detailed description, when read with reference to the appended drawings. In a purely schematic manner, these drawings show in:

FIG. 1 a sectional side view through a device, according to the invention;

FIG. 2 a sectional top view of the device, according to FIG. 1;

FIG. 3 a partial front view of the device from FIGS. 1 and 2; and in

Figure 4:
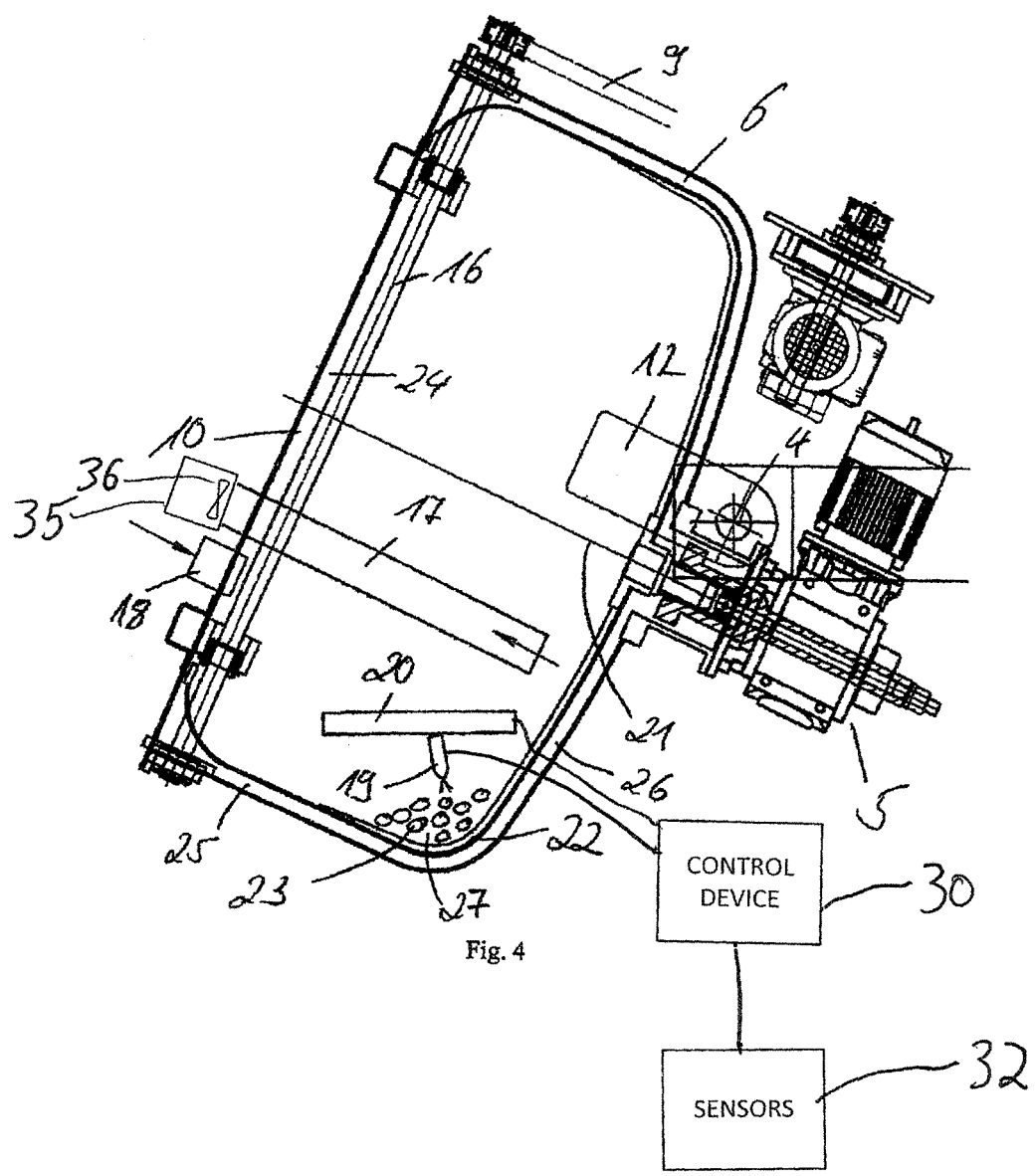

FIG. 4 a partial sectional side view according to FIG. 1 in more detail.

BEST MODE TO CARRY OUT THE INVENTION

FIG. 1 shows a lateral sectional view of a device 1, according to the invention, in which, as can be seen in particular from FIG. 2, a drum 6, rotatable around an axis 21, is pivotably mounted to a frame with two vertical pillars 2 and horizontal pillars 3, mounted thereupon, receiving the small parts 23 (see FIG. 4). Between the horizontal beams 3, a rod 4 is provided, on which the drum 6 is pivotably mounted through the mounting flanges 12 and 14 and the pivot supports 13 and 15, and thus in a position 6', as shown in FIG. 1. Through pivoting around the rod 4, or its longitudinal axis into the position 6', the drum 6 can be emptied in a simple manner. For pivoting, a drive in the form of an electric motor 7 is provided.

Besides the pivoting ability around the rod 4, the drum is rotatable around the axis 21, wherein an electric motor 5 is provided as a rotations drive for this purpose.

The drum 6 has a closure provided as two closure flaps 10, 11 at the drum opening 24 (see FIGS. 1 and 4), as can be seen in particular in FIGS. 2 and 3, wherein the closure flaps can be pivoted from a closed position into an opened position 10', 11' and versa. The opening mechanism provided for this purpose (see FIGS. 2 and 3, and the detail shown in between) comprises an electric motor 8 and connection rods 9, 16, whereupon the closing flaps 10, 11 are provided. Through an operation of the motor 8 and through motions of the connection bars 9 and 16 triggered thereby, the closure flaps 10 and 11 can be opened and closed.

As it becomes apparent, in particular from FIGS. 1 and 4, openings in the form of pass-through spouts 17 and 18 are provided at least at one closure cap. These pass-through spouts 17 and 18 operate as an air intake opening 18 and an air exhaust opening 17. The air intake spout 18 hereby only extends through the closure flap 10 and is thereby only slightly longer than the thickness of the closure flap 10. In comparison, the air exhaust spout 17 is significantly longer and approximately corresponds to the depth of the drum 6, so that the vented air is directly vented from the rear wall 26, located opposite to the drum opening 24. Thereby, a complete ventilation of the entire drum volume is assured.

For evacuation, an evacuation device 35 provided, which is connected with the air vent spout 17, and which can evacuate air from the drum 6 through a fan 36, and which removes the remaining particles from the exhaust air through an exhaust air filter.

Through the disposition of air intake and exhaust spouts 17 and 18 at the closure flap 10, it is accomplished that the spouts 17 and 18 do not protrude into the drum cavity during the emptying process, and thus when the drum 6 is in the position 6', so they cannot interfere with the emptying process.

Also at the closure flap 10, or at the second closure flap 11, the schematically shown radiation emitter device 20, and the also schematically shown spray gun 19 are disposed, wherein this is not shown in particular.

The spray gun 19 is disposed, so that it is formed in the direction of the depression 27, which is formed by the circumferential side wall 25, and the rear wall 26, located opposite to the drum opening 24. This also applies to the emitter device 20, which is located adjacent to the spray gun 19.

The small parts 23 received in the drum 6 accumulate in the depression 27, when the drum 6 is in the coating position, as shown in FIGS. 1 and 4. The coating position is characterized by an inclination of the rotation axis 21, relative to horizontal, so that the small parts to be coated are accumulated in the depression 27. Through the pivotability of the drum 6 around the rod 4 or its longitudinal axis, the inclination of the drum 6, or of the rotation axis 21 can be varied infinitely, and thus between 0° and 90°.

At the inner wall of the drum, conveyor ribs 22 are provided, which are offset along the circumference of the side wall 25, in a star shape at the rear wall 26, coming together towards the drum axis 21, wherein the conveyor ribs 22 protrude into the drum cavity and they are being used to turn over the small parts 23, received in the drum 6, due to the rotation of the drum 6.

The shape of the drum 6 with the round cross section, and also with the circular drum opening 24, and a funnel shaped rear wall 26 and the cylinder shaped side wall 25 is selected, so that good mixing and application of the coating material is assured, while simultaneously providing a high internal storage volume. In particular, the rounded transition from the side wall 25 to the rear wall 26 contributes to this feature.

The spray gun 19 is connected with the supply device for the coating material through a feed line (not shown), and accordingly, when required with a feed device for an auxiliary or carrier material, as, e.g., air or water vapor. The spray gun 19 provides for an atomization of the coating material and for a fine deposition of the coating material on the small parts to be coated, wherein all known methods can be used for this purpose, like in particular also water vapor assisted spraying. In particular, the spray gun 19 is provided so that the smallest amounts of coating material can be deposited in the finest drop or powder volumes in order to create thin films with a very thin layer thickness on the small parts to be coated. Thus, the generated layer thicknesses are so small, that the created coating film immediately dries and/or hardens under the prevailing temperatures or environmental conditions.

The respective temperature, or the necessary environmental conditions are being created through irradiated energy, wherein infrared (IR) emitters or ultraviolet (UV) emitters can be used as radiation emitters. Among the IR emitters, short wave, or long wave IR emitters with a wavelength of preferably 800 through 5000 nm, or IR radiation emitters with a wavelength spectrum near the infrared (near IR or NIR) are being used. Also, so-called carbon IR emitters with a medium wave length spectrum have proven suitable. UV emitters are being used in particular with UV hardening lacquer systems.

Through the energy radiation emitters of the radiation emitter device 20 also the small parts 23 can be quickly brought to the temperature required for drying and/or hardening of e.g. 50° to 100° C., preferably 60° to 80° C., in particular 70° C., and/or the coating material, in particular the lacquer can be dried and/or hardened in a very short period of time.

The device 1 is operated, so that in the coating position shown in FIG. 1, or at another suitable inclination of the drum 6, the material to be coated is deposited as small parts through the open drum opening 24. After closing the drum opening 24 through operating the closure flaps 10 and 11, the drum 6 is brought into a rotating motion around the axis 21 through the motor 5, whereby the small parts 23 are being turned over. Simultaneously with the rotation motion of the drum, the radiation emitter unit 20 is activated, so that the small parts 23 are heated. After reaching the required minimum temperature of the small parts, which are determined by respective sensors 32, the spray gun 19 begins depositing coating material in small portions. The coating material, which is deposited through fine atomization by the spray gun 19 in a very thin layer on the small parts 23, is immediately dried or hardened, through the radiation energy, or by the temperature created thereby, so that through the additional motion of the small parts 23 no undesired layering errors occur.

The emitter device 20 can be switched on and off, or power regulated, depending on requirements, based on the temperature in the drum 6 or of the small parts 23, determined by the sensors 32. For this purpose, a respective control or regulation device 30 can be provided, which can be formed by a programmable computer. Also, the dispensing device in the form of a spray gun 19 can hereby be controlled or regulated through respective parameters, like, e.g., solvent or water vapor content in the drum 6.

During the coating process, the solvents released by the drying coating material, or the respective water vapor, or the respective powder dust are evacuated and provided to the disposal through the intake spouts 18 and exhaust spouts 17.

After a certain coating time, when all small parts 23 are evenly coated with coating material, the rotation of the drum 6 is stopped, the radiation emitter unit 20 is turned off, or still operated for a certain period of time and the spray gun 19 is turned off. The closure flaps 10 and 11 can be opened after a short waiting time, whereby also the spouts 17 and 18, and the radiation device 20, and the spray gun 19 are removed from the gun cavity. Thereby, the drum 6 can be pivoted into the emptying position 6', whereby the coated small parts 23 move into a receiving device (not shown). After pivoting the drum 6 back into the coating position, a new coating process can begin.

Through the fast drying and/or hardening, based on the imparted radiation energy, the process according to an aspect of invention achieves a performance increase, with respect to coating duration, volume throughput, and coating quality.

Though the previously described embodiment constitutes an implementation of the invention, single components can be replaced by similar or identically operating means. Besides the previously described closing elements 10 and 11, also other suitable means can be provided, as e.g., a single cover. Said cover can, in particular, be operated also through another closing motion, e.g., a sliding motion. Also, the described pivoting or opening mechanisms can be replaced by other suitable mechanisms. The same applies to the drives, which cannot only be realized by the illustrated electric motors. Also, other suitable radiation emitters are conceivable.

What is claimed is:

1. A coating system for parts comprising:
    a movable receiver element for receiving parts to be coated and moving and thereby turning over the parts to be coated, said movable receiver element having a circumferential side wall, an opening, a rear wall located opposite to the opening, and an axis of rotation, said movable receiver element is disposed in a coating position characterized by an inclination of the axis of rotation such that the parts to be coated accumulate in a depression between the circumferential side wall and the rear wall of the movable receiver element;
    at least one dispenser device for dispensing a coating material into the movable receiver element, the dispenser device being an air-assisted spray gun or a water-assisted spray gun configured to intermittently dispense coating material by spraying or squirting blasts of the coating material with limited duration; said dispenser device configured to dispense the coating material in the depression between the circumferential side wall and the rear wall where the parts to be coated accumulate when the movable receiver element is disposed in the coating position; said dispenser device is located within the movable receiver element when the movable receiver element is in the coating position;
    at least one infrared (IR) radiation emitter device for emitting infrared (IR) radiation into the movable receiver element; said at least one infrared radiation emitter device disposed to provide the IR radiation in the depression between the circumferential side wall and rear wall where the parts to be coated accumulate when the movable receiver element is disposed in the coating position; said one infrared radiation emitter device is located adjacent to the dispenser device and located within the movable receiver element adjacent to the dispenser device when the movable receiver element is in the coating position;
    a programmable processor configured to control or regulate the at least one IR radiation emitter device and the at least one dispenser device while the parts to be coated are turned over by moving the movable receiver element; said programmable processor configured to control the at least one infrared radiation emitter device to provide infrared radiation to heat the parts to be coated to a required minimum temperature; said programmable processor configured to control the dispenser device to begin dispensing the coating material after the required minimum temperature of the parts to be coated has been reached such that a film is formed from the coating material on the parts to be coated and said film is immediately dried or hardened by the IR radiation provided by the IR radiation emitter device, and
    at least one flap located at the opening of the movable receiver element for loading and unloading of the parts to be coated, said at least one flap pivots from a closed position to an opened position to open and close the opening of the movable receiver element;
    wherein the at least one dispenser device and the at least one IR radiation emitter device are located within the movable receiver element during coating so as to dry and/or harden the coating material, wherein the dispenser device is configured to dispense coating material in amounts such that an immediate drying or hardening of the coating material on the parts to be coated takes place when the required minimum temperature is reached by the IR energy imparted by the IR radiation emitter device.

2. A coating system according to claim 1, wherein:
the movable receiver element is a rotatable drum or a rattling or shaking body.

3. A coating system according to claim 1, wherein:
the at least one IR radiation emitter device comprises at least one radiation emitter from the group comprising short-, medium- or long-wave IR radiation emitters, CIR radiation emitters and NIR radiation emitters.

4. A coating system according to claim 1, wherein:
an opening for incoming air and an opening for exhaust air are provided in the movable receiver element and/or at the at least one flap.

5. A coating system according to claim 4, wherein:
an evacuation device is located at the opening for exhaust air.

6. A coating system according claim 1, further including:
sensors whose output signals are processed through the programmable processor configured to control or regulate the at least one IR radiation emitter device and the at least one dispenser device.

7. A coating system according to claim 2, wherein:
the movable receiver element is a rotatable drum with conveyor ribs on an inside wall.

8. A coating system according to claim 4, wherein: the opening for incoming air has an air intake spout, whose outlet opening ends proximal to a closing element, and the opening for exhaust air has an air exhaust spout, whose intake opening is disposed close to the backside wall located opposite to the closing element.

9. A coating system according to claim 5, wherein:
the evacuation device includes a fan.

10. A coating system according to claim 6, wherein:
the sensors comprise temperature and/or gas or steam sensors.

* * * * *